United States Patent

Sasaki et al.

[11] Patent Number: 4,646,189
[45] Date of Patent: Feb. 24, 1987

[54] MAGNETIC TAPE CASSETTE WITH DOOR OPENING MECHANISM

[75] Inventors: Shin Sasaki; Tsuneo Nemoto, both of Miyagi; Shuichi Yamashina; Hiroyuki Uchida, both of Kanagawa, all of Japan

[73] Assignee: Sony Corporation, Tokyo, Japan

[21] Appl. No.: 679,240

[22] Filed: Dec. 7, 1984

[30] Foreign Application Priority Data

Dec. 13, 1983 [JP] Japan .................................. 58-234887

[51] Int. Cl.⁴ .............................................. G11B 23/02
[52] U.S. Cl. ...................................... 360/12; 242/198
[58] Field of Search ............... 360/132, 131, 128, 129, 360/130.2; 242/197–201; 206/387

[56] References Cited

U.S. PATENT DOCUMENTS 4,235,395 11/1980 Wardenaar et al. ............. 360/132 X
4,519,521 5/1985 Yoshii .............................. 206/387 X

FOREIGN PATENT DOCUMENTS 0059946 9/1982 European Pat. Off. .

Primary Examiner—Stuart N. Hecker
Assistant Examiner—David J. Severin
Attorney, Agent, or Firm—Lewis H. Eslinger; Alvin Sinderbrand

[57] ABSTRACT

A magnetic tape cassette includes a casing with a substantially straight side along which a peripheral wall has an opening for access to magnetic tape contained in the casing between its top and bottom walls which have edge portions projecting beyond the peripheral wall along the straight side, and a lid member having an elongated plate portion dimensioned to extend along the straight side of the casing and to fit closely between the projecting edge portions and ears projecting from opposite ends of the plate portion for disposition against respective end portions of the peripheral wall. Pivot pins are loosely received in respective, preferably triangular, apertures for connecting the ears of the lid member with the casing to permit pivoting of the lid member and its bodily displacement relative to the casing in directions at right angles to the pivoting axis. Thus, the lid member is movable, by a combination of the pivoting and bodily displacement thereof, between a closed position in which the plate portion is between the projecting edge portions at the straight side of the casing for closing the opening therein and an opened position in which the plate portion of the lid is disposed at the outside of the top or bottom wall of the casing adjacent the respective edge portion. Coil springs are connected between the casing and lid member of pivotally urging the latter to a neutral pivoted position in which the plate portion is centered between the projecting edge portions and bodily urging the lid member, in its neutral pivoted position, toward the straight side of the peripheral wall of the casing.

3 Claims, 15 Drawing Figures

MAGNETIC TAPE CASSETTE WITH DOOR OPENING MECHANISM

BACKGROUND OF THE INVENTION

1. Field of the Invention

This invention relates generally to a magnetic tape cassette and, more particularly, is directed to improvements by which a magnetic tape contained in the cassette casing is protected when not in use.

2. Description of the Prior Art

Recording and reproducing apparatus has been recently proposed in which an analog signal, such as, an audio signal or the like, is converted to a digital signal, for example, a PCM (pulse code modulated) signal which is then recorded and/or reproduced. Such PCM recording and reproducing apparatus generally uses, as its record medium, a magnetic tape contained in a magnetic tape cassette. However, one disadvantage of PCM recording is that, if an oily deposit, for example, from a fingerprint or the like, or dust adheres to the magnetic tape, a dropout will result in the reproduced signal. In an attempt to avoid the foregoing problem, it has been proposed to provide a magnetic tape cassette with a casing having an opening through which access may be had to magnetic tape contained in the casing, and with a lid pivoted on the casing for movement between a closed position covering the opening for protecting the tape and an opened position in which the lid uncovers the opening of the casing for providing access to the tape therethrough, as by a recording/reproducing head. In magnetic tape cassettes of the kind being described, the casing has spaced, parallel top and bottom walls and a peripheral wall therebetween which is formed with the opening along a substantially straight side of the casing at the front of the latter, and the lid includes an elongated plate portion dimensioned to extend along the straight side of the casing and having ears projecting from its opposite ends and at which the lid is pivotally mounted on the casing. In the closed position of the lid, its elongated plate portion is closely adjacent to the peripheral wall along the straight side at the front of the casing so as to cover the opening and thereby shield the tape within the casing and, in the opened position of the lid, the latter is pivoted upwardly or downwardly so as to move the elongated plate portion away from in front of the peripheral wall at the straight side of the casing. However, in order to permit such pivotal movements of the lid, it is necessary to provide a substantial clearance between its elongated plate portion and the adjacent peripheral wall of the casing in the closed position of the lid with the result that the space required in a recording and/or reproducing apparatus for accommodating the magnetic tape cassette is undesirably increased. Furthermore, in the existing magnetic tape cassette, the lid may be inadvertently pivoted from its closed position toward its opened position when the cassette is not in use.

OBJECTS AND SUMMARY OF THE INVENTION

Accordingly, it is an object of this invention to provide an improved magnetic tape cassette having a lid that is movable between opened and closed position, and that avoids the foregoing disadvantages of the prior art cassettes.

It is another object of this invention to provide a magnetic tape cassette with a lid that is movable between opened and closed positions, and in which unintentional movement of the lid from its closed position to its opened position is avoided when the cassette is not in use.

It is a further object of this invention to provide a magnetic tape cassette with a lid movable between closed and opened positions, and in which the overall dimensions of the cassette are desirably minimized.

It is still another object of this invention to provide a magnetic tape cassette, as aforesaid, which can tightly seal a magnetic tape within a cassette casing when the cassette is not in use.

It is still a further object of this invention is to provide a magnetic tape cassette, as aforesaid, which is adapted to being automatically assembled.

In accordance with an aspect of this invention, a magnetic tape cassette comprises a casing including spaced, parallel walls and a peripheral wall therebetween for containing a magnetic tape, the casing having a substantially straight side along which the peripheral wall has an opening for access to the tape in the casing, the peripheral wall having end portions substantially at right angles to the straight side at opposite ends of the latter, and the parallel walls having edge portions projecting beyond the peripheral wall along the straight side; a lid member including an elongated plate portion dimensioned to extend along the straight side of the casing and to fit closely between the projecting edge portions, and ears projecting from opposite ends of the plate portion at right angles to the latter for disposition against the end portions of the peripheral wall; cooperatively engageable means for connecting each of the ears with the adjacent one of the end portions of the peripheral wall, each of the cooperatively engageable means including a pivot pin and an aperture in which the pin is loosely received to permit pivoting of the lid member relative to the casing about an axis which is parallel with the straight side and bodily displacement of the lid member relative to casing in directions at right angles to the pivoting axis, the lid member being movable, by a combination of such pivoting and bodily displacement, between a closed position in which the plate portion is between the edge portions and closely adjacent to the peripheral wall at the straight side for closing the opening therein and an opened position in which the plate portion of the lid member is disposed at the outside of one of the parallel walls of the casing adjacent the respective edge portion; and biasing means connected between the casing and the lid member for pivotally urging the latter to a neutral pivotal position in which the plate portion is centered between the edge portions of the parallel walls and acting bodily on said lid member in said neutral pivoted position to urge the plate portion toward said straight side of the peripheral wall.

In a preferred embodiment of this invention, the aperture of each of the cooperatively engageable means has substantially the configuration of an isosceles triangle having a vertex in which the respective pivot pin engages in the closed position of the lid member, with the pivot pin moving out of the vertex for accommodating movement of the plate portion from between the edge portions in the course of the movement of the lid member to its opened position.

Further, in a preferred embodiment of the invention, the biasing means includes a coil spring member associated with each of the engageable means and having a coil portion disposed on the respective pivot pin and arm portions normally extending in opposed, substantially axially aligned directions from the coil portion and being resiliently angularly displaceable relative to each other from such normally extending directions, and anchor means provided on each ear and on the adjacent end portion of the peripheral wall above and below the aperture receiving the respective pivot pin for engagement by the arm portions of the coil spring member, the anchor means above and below the aperture being substantially along a straight line in the closed position of the lid member.

The above, and other objects, features and advantages of the present invention, will become apparent from the following detailed description of illustrative embodiments thereof which is to be read in conjunction with the accompanying drawings forming a part hereof and in which the same reference numerals are employed for identifying corresponding elements and parts in the several views of the drawings.

DESCRIPTION OF THE PREFERRED EMBODIMENTS

Figure 1:
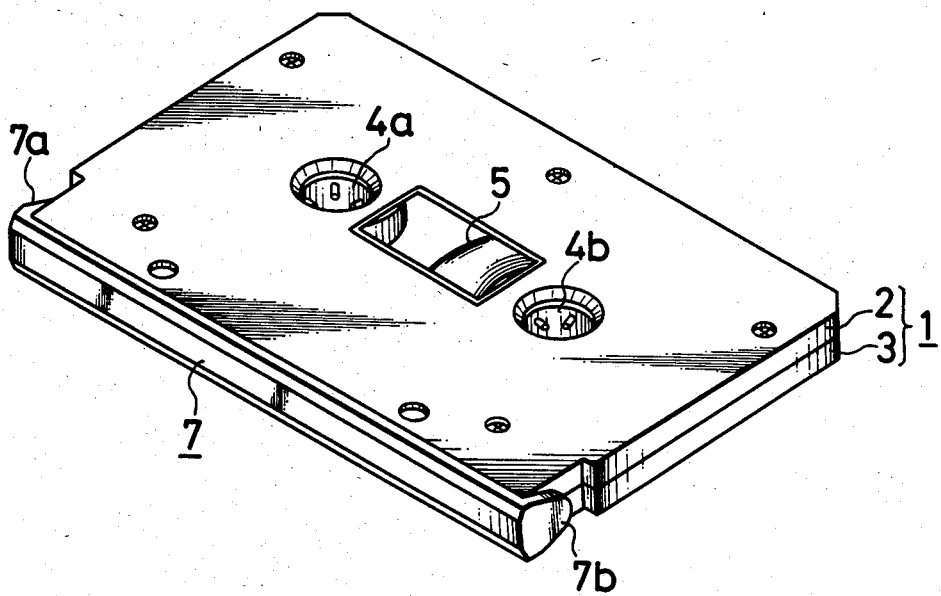
FIG. 1 is a perspective view of a magnetic tape cassette according to the prior art and which is shown with its lid in a closed position.

Before describing embodiments of this invention in detail, reference will be made to a magnetic tape cassette according to the prior art shown on FIGS. 1 and 2 for the purpose of promoting a clear understanding of the disadvantages inherent therein which are to be avoided by the present invention. It will be seen that such magnetic tape cassette according to the prior art generally comprises a casing 1 formed of an upper section 2 and a lower section 3 desirably molded of a suitable plastic and being secured together by screws for containing rotatable reel hubs 4a and 4b on which a magnetic tape 5 is wound. The casing 1 is shown to be substantially rectangular so that its upper and lower sections 2 and 3 respectively include substantially rectangular top and bottom walls with marginal flanges extending therefrom to abut each other and define a peripheral wall by which the top and bottom walls are maintained in spaced, parallel relation. Along a substantially straight side of casing 1 at the front of the latter, the peripheral wall is formed with an opening 6 (FIG. 2) for access to tape 5 in the casing, for example, as by a recording and/or reproducing head (not shown) which may be inserted into opening 6. The magnetic tape cassette according to the prior art is further shown to comprise a lid member 7 formed with an elongated plate portion dimensioned to extend along the straight side of casing 1 having the opening 6 therein, and ears 7a and 7b projecting from opposite ends of such plate portion at right angles to the latter for disposition against end portions of the peripheral wall of casing 1 extending from respective ends of the straight side of the casing having opening 6 therein. The ears 7a and 7b are pivotally mounted on the adjacent end portions of the peripheral wall of casing 1 so that lid member 7 is capable of pivotal movements about a fixed axis between the closed position shown on FIG. 1 for closing the opening 6 and the opened position shown on FIG. 2 in which opening 6 is substantially unobstructed for ready access therethrough to the tape 5.

When the magnetic tape cassette is not in use, lid member 7 may be disposed in its closed position (FIG. 1) so that the fingers of a person handling the cassette cannot come in contact with tape 5 through opening 6. However, by reason of the mounting of lid member 7 for pivoting about a fixed axis relative to casing 1, the lid member cannot engage closely against the peripheral wall of casing 1 at the front of the latter, and hence cannot truly seal opening 6 for ensuring that dust cannot collect or be deposited on tape 5. More particularly, the elongated plate portion of lid member 7 must be spaced forwardly from the flat peripheral wall at the front side of casing 1 when lid member 7 is in its closed position in order to ensure that, during swinging of lid member 7 to its opened position, such plate portion of the lid member will clear the upper or lower edge or corner where the peripheral wall meets the top or bottom wall, respectively, of the casing. The clearance that needs to be provided between the elongated plate portion of lid member 7 and the peripheral wall of casing 1 at the front side of the latter when the lid member is in its closed position, may be reduced by chamferring the corners along the top and bottom edges of the front side of the casing as at 2a and 3a, respectively (FIG. 2). However, since the opening 6 for access to the tape 5 in casing 1 is provided along the front side of the casing, the extent to which the corners at the top and bottom of the front side can be chamfered is limited. Therefore, the provision of a space or clearance between the elongated plate portion of lid member 7 in its closed position and the peripheral wall at the front side of casing 1 is unavoidable in the magnetic tape cassette according to the prior art. Such space or clearance also undesirably increases the overall dimensions of the magnetic tape cassette and the space required to accommodate the cassette in a recording and/or reproducing apparatus.

Furthermore, in the described magnetic tape cassette according to the prior art, there is no provision for avoiding inadvertent opening of lid member 7 when the cassette is not in use and, in that case, undesirable contact with the tape 5 through opening 6 or the deposit of dust on the tape may occur.

Figure 2:
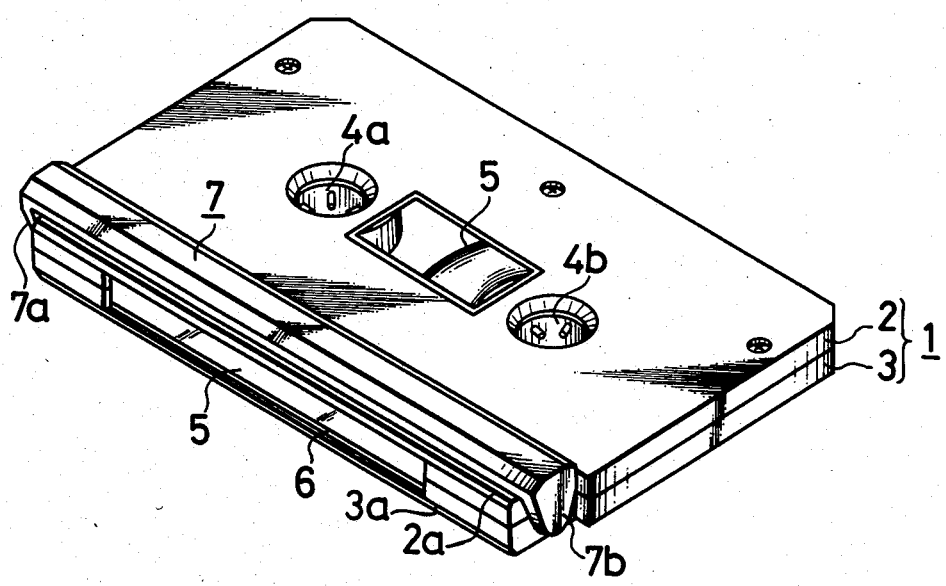
FIG. 2 is a perspective view similar to FIG. 1, but showing the magnetic tape cassette according to the prior art with its lid in the opened position thereof.
Figure 3:
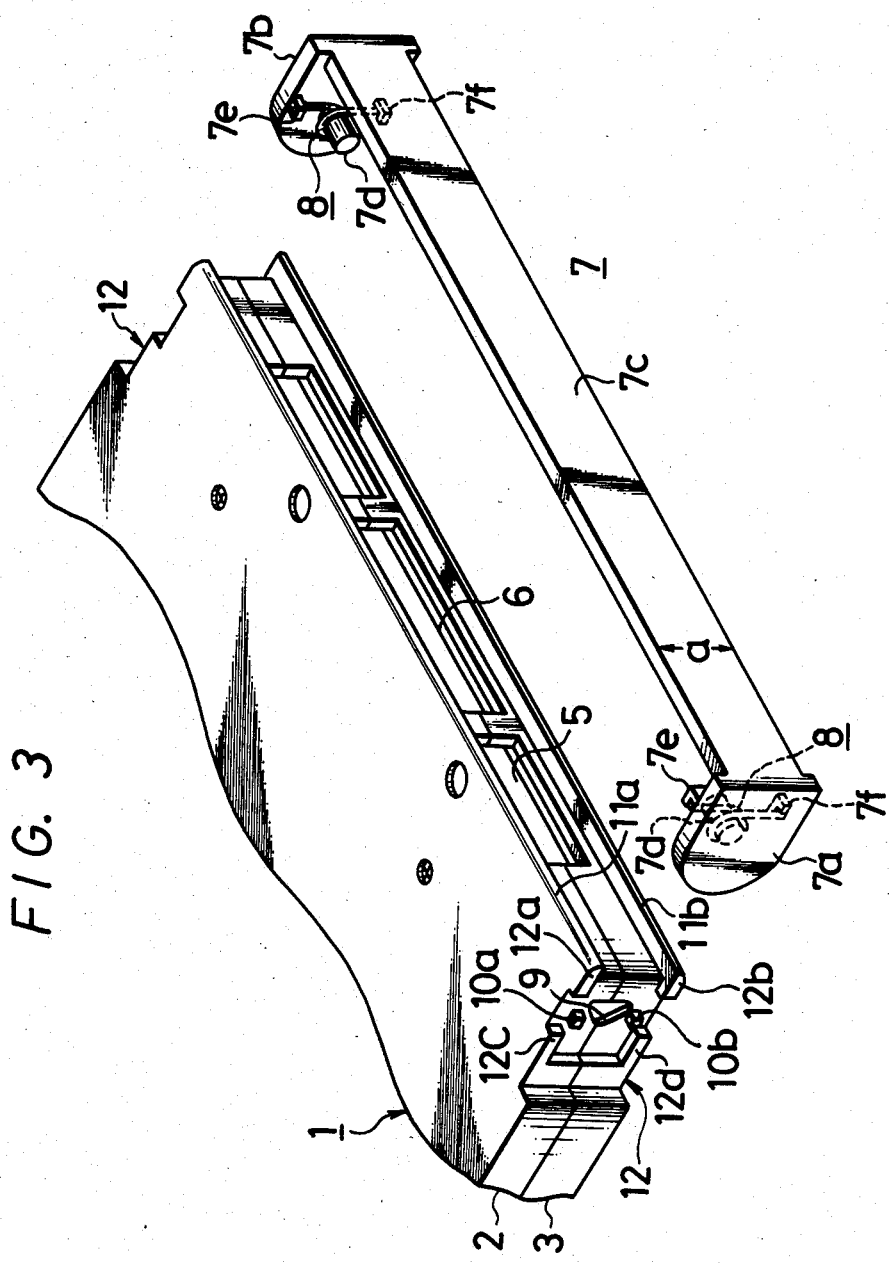
FIG. 3 is an exploded perspective view showing, on an enlarged scale, a portion of the casing and the lid member of a magnetic tape cassette according to an embodiment of the present invention.

Referring now to FIGS. 3–8, it will be seen that, in the magnetic tape cassette according to an embodiment of the present invention there illustrated, the various parts corresponding to those described above with reference to the prior art cassette of FIGS. 1 and 2 are identified by the same reference numerals. In the magnetic tape cassette according to the invention, the elongated plate portion 7c of lid member 7 has a width a (FIG. 3) slightly greater than the width (in the vertical direction) of opening 6. Further, the width or dimension a of plate portion 7c is substantially equal to the vertical distance between edge portions 11a and 11b of the top and bottom walls, respectively, of casing 1 which project beyond the peripheral wall of the casing along the straight side at the front of casing 1. The projecting edge portions 11a and 11b are desirably rounded, as is apparent on FIGS. 6 and 7. The distance that projecting edge portions 11a and 11b extend beyond the peripheral wall therebetween is selected to be approximately equal to the thickness of plate portion 7c.

The ears 7a and 7b extending at right angles to elongated plate portion 7c at the opposite ends, respectively, of the latter, are substantially D-shaped so as to have substantially rectangular forward portions of a height slightly larger than the width a of plate portion 7c and semi-circular rear end portions. In the embodiment of the invention being here described, each of ears 7a and 7b has a pivot pin 7d directed inwardly therefrom at the center of the semi-circular portion of the respective ear, so that the pivot pins 7d are axially aligned with each other. As shown particularly on FIGS. 4 and 5 in respect to ear 7a, at the top and bottom of each of ears 7a and 7b, there are provided generally L-shaped spring anchors 7e and 7f, respectively. The L-shaped spring anchors 7e and 7f extend inwardly from the respective ear 7a or 7b and open rearwardly, that is, in the direction away from elongated plate portion 7c. Further, spring anchors 7e and 7f are located substantially along a straight line which is approximately parallel to the plane of plate portion 7c and which is substantially tangential to the surface of the respective pivot pin 7d at the side of the latter facing toward plate portion 7c.

Figure 4:
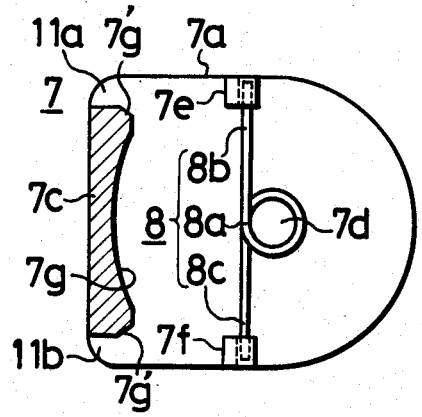
FIG. 4 is a further enlarged, cross-sectional view of the lid member of FIG. 3 for particularly showing a coil spring mounted on an ear at an end of the lid member.
Figure 5:
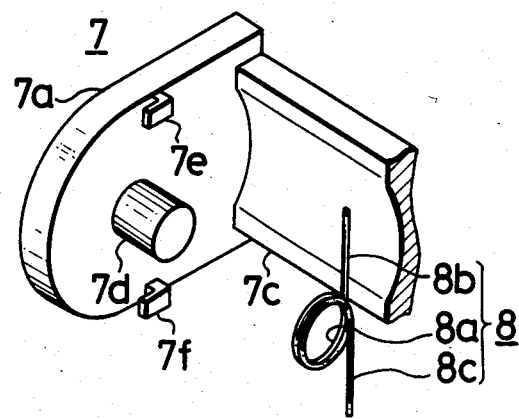
FIG. 5 is an exploded, fragmentary perspective view of the elements appearing in FIG. 4.
Figure 6:
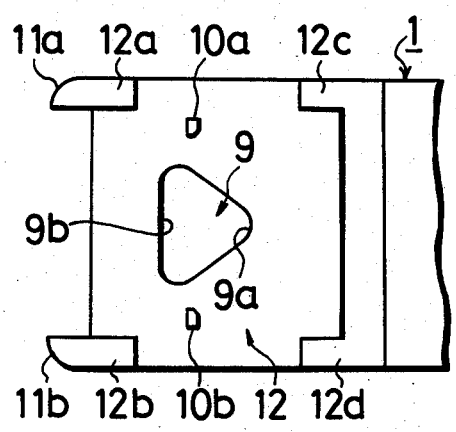
FIG. 6 is an enlarged, fragmentary end elevational view illustrating a bearing aperture provided in an end portion of the casing shown in FIG. 3.

As shown particularly on FIG. 4, the back or inner surface 7g of plate portion 7c of the lid member is cylindrically concave about an axis that coincides with the axis of pivot pins. Further, plate portion 7c has chamfered corners 7'g along the top and bottom margins of its inner surface 7g so as to facilitate the entry of plate portion 7c between projecting edge portions 11a and 11b of the casing during the movement of lid member 7 to its closed position.

Associated with each of the ears 7a and 7b, in the embodiment of the present invention illustrated on FIGS. 3–8, is a coil spring member 8 which includes a coil portion 8a wrapped about the respective pivot pin 7d and arm portions 8b and 8c extending tangentially from coil portion 8a and normally being in opposed, substantially axial alignment with each other. At least initially, arm portions 8b and 8c have their ends engaged by spring anchors 7e and 7f, respectively, for retaining each coil spring member 8 in mounted relation to the respective ear 7a or 7b during the assembling of lid member 7 with casing 1.

The end portions of the peripheral wall of casing 1 which extend from the ends of the straight side at the front of the casing are recessed, as at 12 (FIG. 3) for accommodating ears 7a and 7b when lid member 7 is mounted on casing 1. As shown on FIGS. 3, 6 and 7, for the purpose of such mounting of lid member 7 on casing 1, the recessed end portions 12 of the peripheral wall have apertures 9 formed therein for loosely receiving pivot pins 7d extending from ears 7a and 7b. By reason of such loose reception of pivot pins 7d in apertures 9, lid member 7 is connected to casing 1 in a manner to permit pivoting of the lid member relative to the casing about an axis defined by pivot pins 7d and which is parallel with the straight side at the front of the casing having the opening 6 therein, and further to permit bodily displacement of lid member 7 relative to casing 1 in directions at right angles to such axis. In the magnetic tape cassette according to this invention, lid member 7 is movable, by a combination of its pivoting movement and bodily displacement, between its closed position (FIG. 7) in which plate portion 7c is between projecting edge portions 11a and 11b and closely adjacent to the peripheral wall of the casing at the straight side thereof for closing the opening 6, and an opened position (FIG. 12) in which plate portion 7c of lid member 7 is disposed at the outside of the top wall of the casing adjacent the respective edge portion 11a so as to avoid any obstruction of opening 6. In the embodiment of the invention illustrated in FIGS. 3–12, each of the apertures 9 has the configuration of substantially an isosceles triangle having a vertex 9a (FIG. 6) toward the rear of the aperture, that is, directed away from the straight side at the front of the casing, and with a side 9b of the triangular aperture 9 opposed to the vertex 9a being parallel with the plane of the peripheral wall of the casing at the straight front side thereof. As shown particularly on FIG. 3, each of triangular apertures 9 desirably has its upper half formed in the marginal flange of upper casing section 2 and its lower half formed in the marginal flange of lower casing section 3.

At the outer surface of each recessed end portion 12 of the peripheral wall of casing 1, there are additional spring anchors 10a and 10b disposed above and below, respectively, aperture 9 and being vertically aligned and spaced apart by a distance smaller than the distance between spring anchors 7e and 7f, as shown particularly on FIG. 7. Moreover, spring anchors 10a and 10b are positioned relative to aperture 9 in the direction along the latter between its vertex 9a and opposing side 9b so that, when pivot pins 7d are engaged in apertures 9 and seat against the respective vertices 9a with lid member 7 in its closed position (FIG. 7), spring anchors 10a and 10b lie on a straight line with spring anchors 7e and 7f and are engageable rearwardly against arm portions 8b and 8c, respectively, of the coil spring members.

Further, each of the recessed end portions 12 of the peripheral wall has spaced apart upper flanges or ribs 12a and 12c and spaced apart lower flanges or ribs 12b and 12d (FIGS. 3, 6 and 7) projecting therefrom for slidable engagement by the inner surface of the respective ear 7a or 7b of lid member 7. The spacing between upper ribs 12a and 12c and lower ribs 12b and 12d are large enough to accommodate the movements of spring anchors 7e and 7f on the adjacent ear 7a or 7b and also the movements of the respective coil spring member 8 in response to the movements of lid member 7 between its opened and closed positions.

The operation of the magnetic tape cassette according to the above described embodiment of this invention will now be described with reference to FIGS. 7-12.

Figure 7:
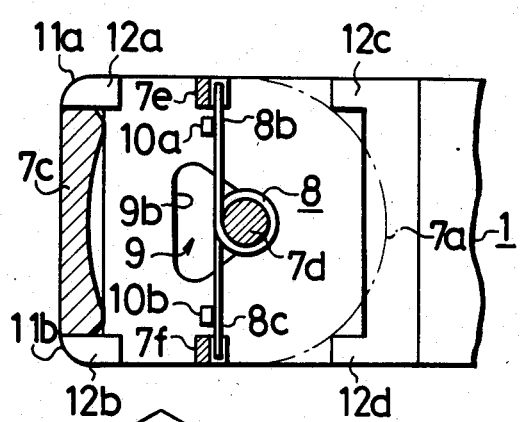
FIG. 7 is a fragmentary sectional view showing the portion of the lid member appearing on FIG. 4 assembled in respect to the end portion of the casing appearing on FIG. 6.
Figure 8:
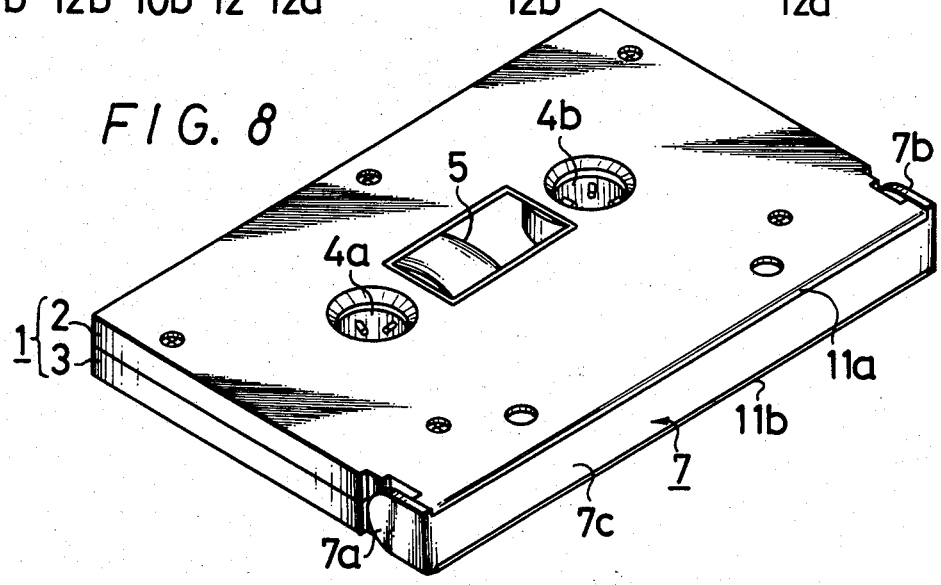
FIG. 8 is a perspective view of the magnetic tape cassette according to the embodiment of the invention illustrated by FIGS. 3-7, and which is shown with its lid member in the closed position thereof.

When the magnetic tape cassette is not in use, as shown on FIGS. 7 and 8, plate portion 7c of lid member 7 is disposed between projecting edge portions 11a and 11b of casing 1 for sealing the opening 6 extending along the front side of the casing. With lid member 7 in its closed position, each of the pivot pins 7d is disposed in the vertex 9a of the respective triangular aperture 9 and arm portions 8b and 8c of each coil spring member 8 are engaged, from in front, by spring anchors 10a and 10b for slightly urging the arm portions of each coil spring member 8 toward the rear. By reason of the foregoing, each pivot pin 7d is urged rearwardly into the vertex 9a of the respective aperture 9 with the result that plate portion 7c of the lid member is drawn or urged rearwardly between edge portions 11a and 11b so as to bear against the peripheral wall for sealing opening 6, as previously mentioned. Thus, contact with tape 5 within casing 1 and the accumulation of dust on the tape are prevented. Moreover, since plate portion 7c is engaged between the projecting edge portions 11 and 11b of the casing in the closed position, the application of an external force tending merely to turn lid member 7 about the axis defined by pivot pins 7d is ineffective to move lid member 7 away from its closed position toward its opened position. Therefore, protection is securely afforded to the tape contained within casing 1 when lid member 7 is in its closed position. Further, since plate portion 7c of lid member 7 engages closely against the peripheral wall of casing 1 at the front side of the latter when lid member 7 is in its closed position, that is, no clearance exists between plate portion 7c and the adjacent peripheral wall of the casing in the closed position, the overall size of the cassette is relatively reduced for minimizing the size of the space that is required in the recording and/or reproducing apparatus for accommodating the cassette. It will also be seen that the engagement of spring anchors 10a and 10b with arm portions 8b and 8c of each coil spring member 8 in the closed position of lid member 7 avoids unintentional forward movement of lid member 7 from its fully closed position in which plate portion 7c is between projecting edge portions 11a and 11b.

Figure 9:
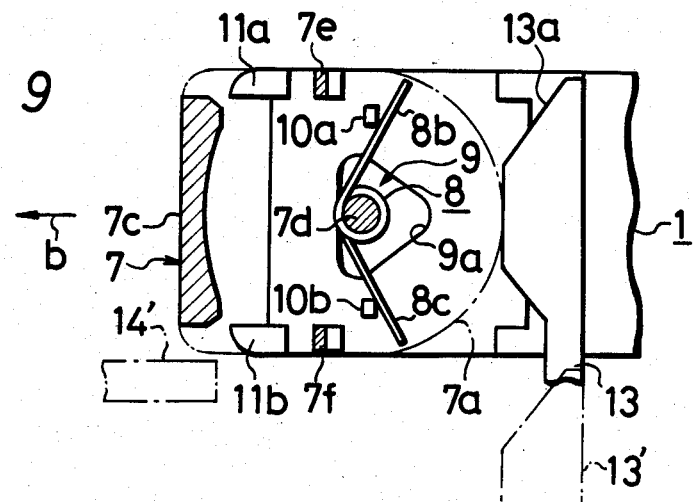
FIGS. 9, 10, 11 and 12 are fragmentary sectional views similar to that of FIG. 7, but illustrating successive stages in the movement of the lid member from its closed position to its opened position.
Figure 10:
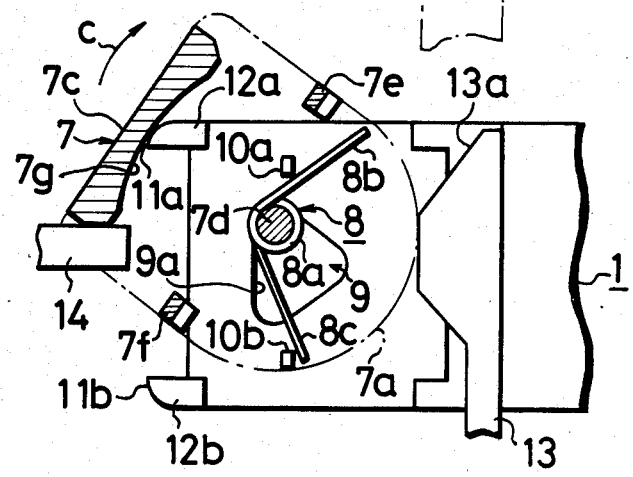
Figure 11:
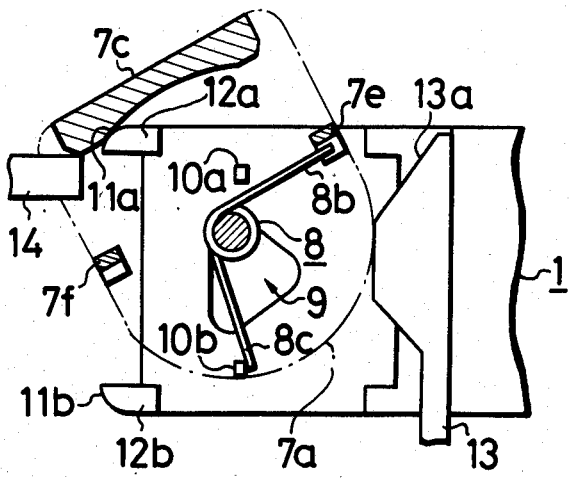

When the magnetic tape cassette is to be used, for example, when it is desired to record or reproduce signals on tape 5 by means of a head engageable therewith through opening 6, lid member 7 is first bodily displaced forwardly in the direction of the arrow b on FIG. 9 relative to casing 1, and then lid member 7 is pivoted relative to casing 1, for example, in the upward direction as indicated by the arrow c on FIG. 10. In the following detailed description of such movements of lid member 7 relative to casing 1, it will be assumed that the movements are effected mechanically by suitable lid actuating members 13 and 14 forming part of a recording and/or reproducing apparatus and being operable when the cassette is operatively positioned within such apparatus.

Thus, for example, as shown on FIG. 9, after the magnetic tape cassette has been loaded or operatively positioned in the recording and/or reproducing apparatus, lid actuating member 13 having upwardly directed heads 13a of substantially trapezoidal configuration is suitably moved upwardly into the cassette from an inoperative position shown in dot-dash lines at 13' to the operative position shown in full lines. In the course of such upward movement of actuating member 13 to its operative position, inclined surfaces of trapezoidal heads 13a act forwardly against the curved edge surfaces of the semi-circular portions of the respective ears 7a and 7b for displacing lid member 7 forwardly in the direction of the arrow b until plate portion 7c is removed from between projecting edge portions 11a and 11b of casing 1. During such forward movement of lid member 7 by trapezoidal heads 13a on actuating member 13, pivot pins 7d are moved forwardly out of the vertices 9a of the respective apertures 9. Due to the engagement of spring anchors 10a and 10b with arm portions 8b and 8c of each coil spring member 8, the forward movement of lid member 7 is resisted by coil spring members 8 whose arm portions 8b and 8c are substantially equally urged into a V-shaped configuration for tending to maintain the respective pivot pin 9d vertically centered in the respective aperture 9.

After lid member 7 has been moved forwardly to the position shown on FIG. 9, second lid actuating member 14 is moved upwardly from its inoperative position shown in dot-dash lines at 14' on FIG. 9. In the course of such upward movement of actuating member 14, the latter engages under the lower edge of plate portion 7c of lid member 7 so as to progressively turn the lid member to its opened position, as shown on FIGS. 10, 11 and 12. More specifically, when the forwardly displaced lid member 7 is initially urged upwardly by the engagement of actuating member 14 with its lower edge, each pivot pin 7d is moved upwardly along the forward side 9a of the respective triangular aperture 9 for suitably shifting the pivoting axis of lid member 7 so as to clear projecting edge portion 11a. During the upward movement of each pivot pin 7d along side 9a of triangular aperture 9, the arm portion 8b of the respective coil spring member is engaged by the spring anchor 10a at positions progressively closer to coil portion 8a and further reducing the angle between arm portion 8b and 8c.

As the upward movement of actuating member 14 is continued, concave inner surface 7g of plate portion 7c of the lid member moves smoothly over rounded projecting edge portion 11a (FIG. 10). With continued upward movement of actuating member 14, spring anchor 7e on each of the ears 7a and 7b moves against arm portion 8b of the respective coil spring member 8 (FIG. 11) so that further pivoting of lid member 7 to its fully opened position (FIG. 12) encounters further yieldable resistance of coil spring members 8. It will be appreciated that, during the turning of lid member 7 to its fully opened position against the forces of coil spring members 8, pivot pins 7d are suitably shifted within the triangular apertures 9 for ensuring that equal biasing forces are applied to arm portions 8b and 8c of each coil spring member. Such shifting movements of pivot pins 7d further ensure that, at all times during the turning of lid member 7 through the positions shown on FIGS. 10, 11 and 12, concave inner surface 7g of plate portion 7c continuously slidably engages the rounded projecting edge portion 11a of the casing. As a result of the foregoing, plate portion 7c of the lid member remains close to casing 1 as lid member 7 moves to and from its fully opened position and, therefore, the space required in the recording and reproducing apparatus for accommodating the cassette and the overall size of such apparatus can be reduced.

Figure 12:
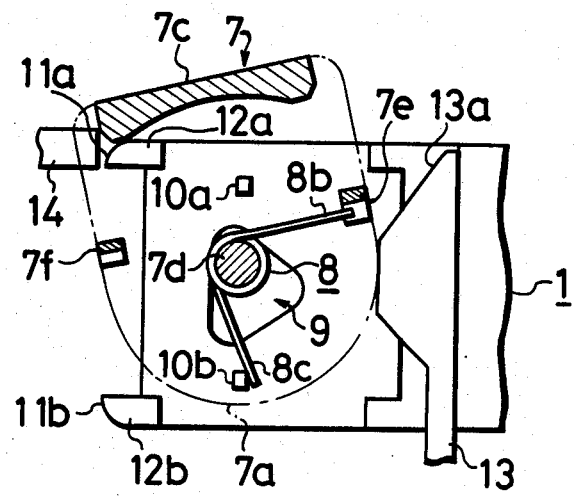

When the operatively positioned cassette has its lid member 7 in the fully opened position shown on FIG. 12, a recording or reproducing operation can be performed on the tape 5 by means of a head (not shown) extending through opening 6 at the front of the casing 1 without any interference from the opened lid member. Upon the completion of a recording or reproducing operation, lid actuating member 14 may be returned downwardly from the position shown on FIG. 12 to the inoperative position indicated at 14' on FIG. 9. In the course of such downward movement of actuating member 14, the loaded or biased coil spring members 8 are effective to turn lid member 7 from the position shown on FIG. 12 through the positions shown on FIGS. 11 and 10 to the position shown on FIG. 9. Thereafter, the downward return of actuating member 13 to its inoperative position shown in dot-dash lines at 13' on FIG. 9, permits the loaded or biased coil spring members 8 to slidably return lid member 7 in the direction opposed to the arrow b for restoring lid member 7 to its fully closed position shown on FIG. 7 and in which arm portions 8b and 8c of each coil spring member 8 are again axially aligned.

Although the operation of the magnetic tape cassette according to this invention has been described for the case in which lid member 7 is bodily displaced forwardly and then pivoted upwardly to its opened position, it will be appreciated that, with the magnetic tape cassette according to this invention, lid member 7 may be similarly displaced forwardly from its closed position and then pivoted downwardly to an opened position against edge portion 11b of the bottom wall of casing 1.

When assembling the above-described magnetic tape cassette according to this invention, the coil spring members 8 are initially mounted on ears 7a and 7b of lid member 7 with coil portion 8a of each coil spring member being wrapped about the respective pivot shaft 7d and with arm portions 8b and 8c of the coil spring member being engaged by spring anchors 7e and 7f on the respective ear. Thereafter, lid member 7 is placed on lower casing section 3 with its pivot pins 7d lodged in the lower halves of apertures 9 and its plate portion 7c resting on projecting edge portion 11b against the flange of section 3 at the front side of the latter. Then, upper casing section 2 is simply brought down on section 3 with plate portion 7c of lid member 7 already positioned to be disposed between projecting edge portions 11a and 11b, whereby pivot pins 7d are automatically located in apertures 9 and arm portions 8b and 8c of each coil spring member are automatically properly disposed in respect to spring anchors 10a and 10b. It will be apparent that the foregoing simple procedure for assembling the magnetic tape cassette according to this invention can be conveniently carried out in a suitable machine.

Figure 13:
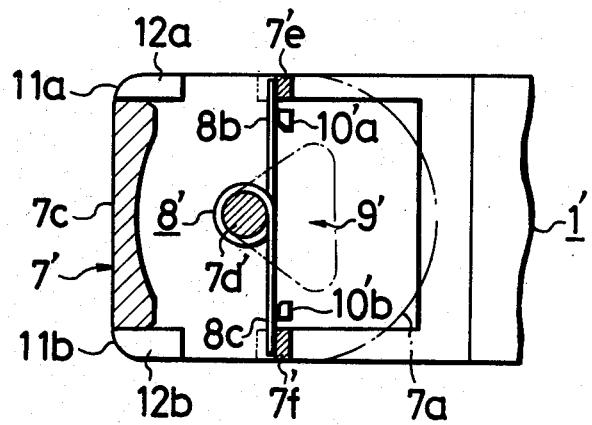
FIG. 13 is a fragmentary sectional view similar to that of FIG. 7, but illustrating a magnetic tape cassette according to another embodiment of this invention.
Figure 14:
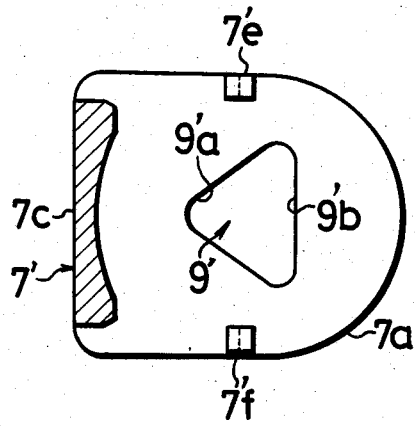
FIGS. 14 and 15 are fragmentary sectional views similar to FIGS. 4 and 6, respectively, but illustrating portions of the lid member and casing, respectively, of the magnetic tape cassette illustrated by FIG. 13.
Figure 15:
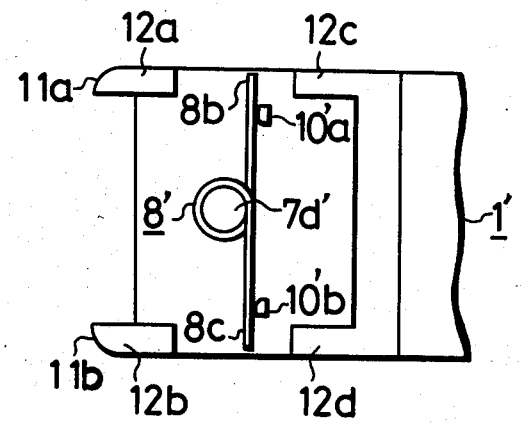

Referring now to FIGS. 13-15, it will be seen that, in a magnetic tape cassette according to another embodiment of this invention, the casing 1' and lid member 7' are generally similar to the correspondingly numbered components of the first described embodiment of the invention and differ substantially therefrom only in respect to the means provided for connecting lid member 7' to casing 1'. More particularly, in the embodiment of FIGS. 13-15, the pivot pins 7'd of such connecting means extend from the end portions of the peripheral wall of casing 1', while the triangular apertures 9' for loosely receiving the pivot pins 7'd are formed in the ears 7a (7b) at the opposite ends of lid member 7', for example, as is shown in respect to the ear 7a on FIG. 14. Further, in this case, each triangular aperture 9' has its vertex 9'a directed toward plate portion 7c of lid member 7, and the side 9'b of the triangular aperture opposite vertex 9'a is substantially parallel to the plane of plate portion 7c. Furthermore, spring anchors 7'e and 7'f provided on each of the ears 7a and 7b of lid member 7' are arranged to open forwardly, that is, in the direction toward plate portion 7c.

As shown particularly on FIGS. 13 and 15, each of the coil spring members 8' is arranged on the respective pivot pin 7'd so that its arm portions 8b and 8c are tangential to the respective pivot pin 7'd at the back of the latter. The spring anchors 10'a and 10'b are shown to be located to engage, from in back, against arm portions 8b and 8c, respectively, of coil spring member 8' when such arm portions of the coil spring member are axially aligned with each other in the vertical direction. The forwardly opening spring anchors 7'e and 7'f on each of the ears 7a (7b) are located to be aligned along a straight line with spring anchors 10'a and 10'b when lid member 7' is in its fully closed position, as shown on FIG. 13.

It will be appreciated that the magnetic tape cassette described above with reference to FIGS. 13-15 operates similarly to the cassette described with reference to FIGS. 3-12. Thus, in the magnetic tape cassette of FIGS. 13-15, lid member 7' can be pivotally moved from its fully closed position shown on FIG. 13 only after the lid member has been displaced forwardly relative to the casing 1' to an extent sufficient to withdraw plate portion 7c of the lid member from between the projecting edge portions 11a and 11b of the casing. After such forward bodily displacement of lid member 7' relative to casing 1', the lid member can be pivoted about an axis defined by pivot pins 7'd to an open position in which the concave inner surface of plate portion 7c rides closely against the rounded projecting edge portion 11a or 11b. As in the first described embodiment, coil spring members 8' act to resist bodily displacement of lid member 7' from its fully closed position in which plate portion 7c is retained between projecting edge portions 11a and 11b, and also to resist pivoting movements of lid member 7' from its neutral or centered position.

Although the apertures 9 and 9' acting as bearing members for the pivot pins 7d or 7'd have been shown to be triangular, it will be understood that bearing members of other configurations can be employed so long as they permit the requisite bodily displacement, as well as pivoting, of the lid member 7 or 7' relative to the casing 1 or 1'.

Having specifically described preferred embodiments of the invention with reference to the accompanying drawings, it is to be understood that the invention is not limited to those embodiments, and that various changes and modifications can be effected therein by one skilled in the art without departing from the scope or spirit of the invention as defined by the appended claims.

What is claimed is:

1. A magnetic tape cassette comprising:
   a casing including spaced, parallel walls and a peripheral wall therebetween for containing a magnetic tape, said casing having a substantially straight side along which said peripheral wall has an opening for access to the tape in said casing, said peripheral wall having end portions subtantially at right angles to said straight side at opposite ends of the latter, and said parallel walls having edge portions projecting beyond said peripheral wall along said straight side;

a lid member including an elongated plate portion dimensioned to extend along said straight side of the casing and to fit closely between said projecting edge portions, and ears projecting from opposite ends of said plate portion at right angles to the latter for disposition against said end portions of the peripheral wall;

cooperatively engageable means for connecting each of said ears with the adjacent one of said end portions of the peripheral wall, each of said cooperatively engageable means including a pivot pin and an aperture in which said pin is loosely received to permit pivoting of said lid member relative to said casing about an axis which is parallel with said straight side and bodily displacement of said lid member relative to said casing in directions at right angles to said axis, said lid member being movable, by a combination of said pivoting and said bodily displacement, between a closed position in which said plate portion is between said edge portions, and closely adjacent to said peripheral wall at said straight side for closing said opening therein and an opened position in which said plate portion of the lid member is disposed at the outside of one of said parallel walls of the casing adjacent the respective edge portions, said aperture having substantially the confuiguration of an isosceles triangle having a vertex in which the respective pivot pin engages in said closed position of the lid member, with said pivot pin moving out of said vertex for accommodating movement of said plate portion from between said edge portions in the course of movement of the lid member to said opened position; and biasing means connected between said casing and said lid member for pivotally urging the lattter to a neutral pivoted position in which said plate portion is centered between said edge portions of the parallel walls and acting bodily on said lid member in said neutral pivoted position to urge said plate portion toward said straight side of the peripheral wall, said biasing including a coil spring member associated with each of said engageable means and having a coil portion dispsoed on the respective pivot pin and arm portions normally extending in opposed, substantially axially aligned directions from said coil portion and being resiliently angularly displaceable relative to each other from said normally extending directions, and anchor means on each said ear and said adjacent end portion of the peripheral wall above and below said aperture receiving the respective pivot pin for engagement by said arm portions of the coil spring member, said anchor means above and below the aperture being substantially along a straight line in said close position of the lid member.

2. A magnetic tape cassette comprising:

a casing including spaced, parallel walls and a peripheral wall therebetween for containing a magnetic tape, said casing having a substantially straight side along which said peripheral wall has an opening for access to the tape in said casing, said peripheral wall having end portions substantially at right angles to said straight side at opposite ends of the latter, and said parallel walls having edge portions projecting beyond said peripheral wall along said straight side;

a lid member including an elongated plate portion dimensioned to extend along said straight side of the casing and to fit closely between said projecting edge portions, and ears projecting from opposite ends of said plate portion at right angles to the latter for disposition against said end portions of the peripheral wall;

cooperatively engageable means for connecting each of said ears with the adjacent one of said end portions of the peripheral wall, each of said coopratively engageable means including a pivot pin and an aperture in which said pin is loosely received to permit pivoting of said lid member relative to said casing about an axis which is parallel with said straight side and bodily displacement of said lid member relative to said casing in directions at right angles to said axis, said lid member being movable, by a combination of said pivoting and said bodily displacement, between a closed position in which said plate portion is between said edge portion, and closely adjacent to said peripheral wall at said straight side for closing said opening therein and an opened position in which said plate portion of the lid member is disposed at the outside of one of said parallel walls of the casing adjacent the respective edge portion, said aperture having substantially the configuration of an isosceles triangle having a vertex in which the respective pivot pin engages in said closed position of the lid member, with said pivot pin moving out of said vertex for accommodating movement of said plate portion from between said edge portions in the course of the movement of the lid member to said opened position, each said pivot pin extending from the respective ear of said lid member, and each said aperture being formed in said adjacent end portion of the peripheral wall with said vertex directed away from said straight side and with a side of the traiangular aperture opposed to said vertex being parallel with the plane of said peripheral wall at said straight side; and biasing means connected between said casing and said lid member for pivotally urging the latter to a neutral pivoted position in which said plate portion is centered between said edge portions of the parallel walls and acting bodily on said lid member in said neutral pivoted position to urge said plate portion toward said straight side of the peripheral wall, said biasing means including a coil spring member associated with each of said engageable means and having a coil portion disposed on the respective pivot pin and arm portions normally extending in opposed, substantially axially aligned directions from said coil portion and being resiliently angularly displaceable relative to each other from said normally extending directions, and anchor means on each said ear and said adjacent end portion of the peripheral wall for engagement by said arm portions of the associated coil spring member, said anchor means being disposed above and below said aperture in said adjacent end portion substantially along a straight line when said lid member is in said closed position.

3. A magnetic tape cassette comprising:

a casing including spaced parallel walls and a peripheral wall therebetween for containing a magnetic tape, said casing having a substantially straight side along which said peripheral wall has an opening for access to the tape in said casing, said peripheral wall having end portions substantially at right angles to said straight side at opposite ends of the latter, and said parallel walls having edge portions projecting beyond said peripheral wall along said straight side;

a lid member including an elongated plate portion dimensioned to extend along said straight side of the casing and to fit closely between said projecting edge portions, and ears projecting from opposite ends of said plate portion at right angles to the latter for disposition against said end portions of the peripheral wall;

cooperatively engageable means for connecting each of said ears with the adjacent one of said end portions of the peripheral wall, each of said cooperatively engageable means including a pivot pin extending from the respective end portion of the peripheral wall and an aperture formed in the respective ear of the lid member and in which said pin is loosely received to permit pivoting of said lid member relative to said casing about an axis which is parallel with said straight side and bodily displacement of said lid member relative to said casing in directions at right angles to said axis, said lid member being movable, by a combination of said pivoting and said bodily displacement, between a closed position in which said plate portion is betweeb said edge portions and closely adjacent to said peripheral wall at said straight side for closing said opening therein and an opened position in which said plate portion of the lid member is disposed at the outside of one of said parallel walls of the casing adjacent the respective edge portion, said aperture having substantially the configuration of an isosoceles triangle having a vertex directed toward said plate portion and in which the respective pivot pin engages in said closed position of the lid member, with said pivot pin moving out of said vertex for accommodating movement of said plate portion from between said edge portions in the course of the movement of the lid member to said opened position, each triangular aperture further having a side thereof opposite said vertex extending substantially parallel to the plane of said plate portion; and biasing means connected between said casing and said lid member for pivotally urging the latter to a neutral pivoted position in which said plate portion is centered between said edge portions of the parallel walls and acting bodily on said lid member in said neutral pivoted position to urge said plate portion toward said straight side of the peripheral wall, said biasing means including a coil spring member associated with each of said engageable means and having a coil portion disposed on the respective pivot pin and arm portions normally extending in opposed, substantially axially aligned directions from said coil portion and being resiliently angularly displaceable relative to each other from said normally extending directions, and anchor means on each said ear and on said adjacent end portion of the peripheral wall for engagement by said arm portios of the associated coil spring member, said anchor means being disposed above and below said aperture in said adjacent end portion substantially along a straight line when said lid member is in said closed position.

* * * * *